C. W. T. DAVIES.
NECKTIE.
APPLICATION FILED MAY 9, 1907.
964,496.
Patented July 19, 1910.
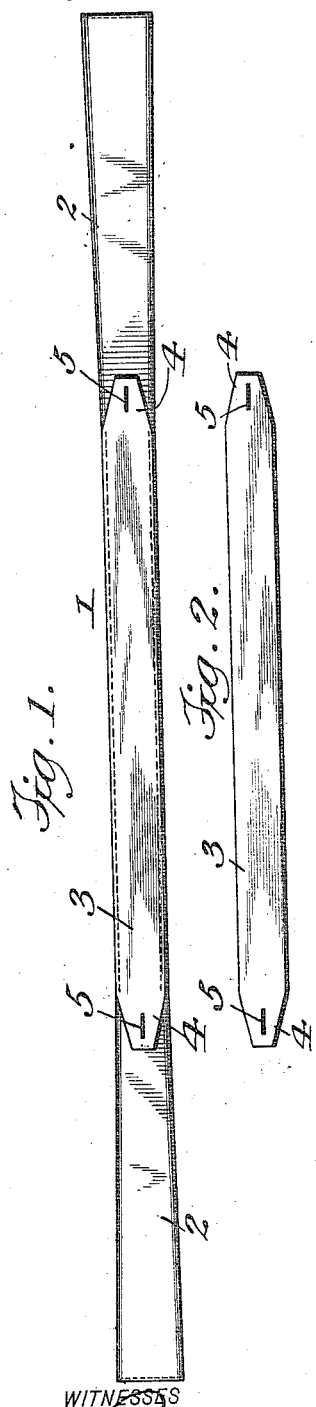
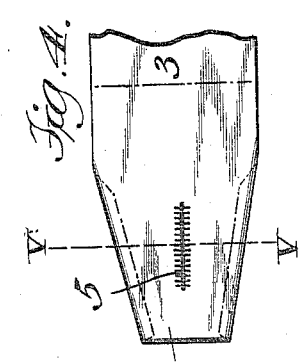
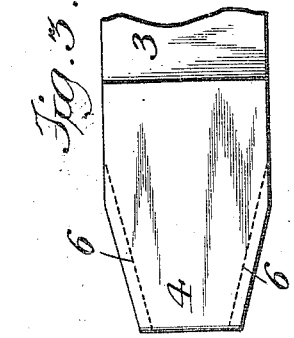
Charles W. T. Davies INVENTOR
BY
Bapter Morton ATTORNEY
WITNESSES

UNITED STATES PATENT OFFICE.

CHARLES W. T. DAVIES, OF NEW YORK, N. Y.

NECKTIE.

964,496.   Specification of Letters Patent.   Patented July 19, 1910.

Application filed May 9, 1907. Serial No. 372,816.

*To all whom it may concern:*

Be it known that I, CHARLES W. T. DAVIES, a citizen of the United States, residing in the borough of Manhattan, city, county, and State of New York, have invented a new and useful Improvement in Neckties, of which the following is a specification.

This invention relates to articles of neckwear and particularly to neckties or cravats of the type in which connections are provided upon the neckband portion adjacent to the tying ends to engage with the front collar-button, or with the collar at points adjacent to the front collar-button, to secure the neckband in position about the base of the collar. The present invention is an improvement upon the necktie of this type covered broadly in my prior Patent No. 605,947 and is designed to avoid the direct pull upon the single thin fabric of the necktie which results when the tabs or connections are formed integral with its inner ply, to avoid the necessity for slits in the fabric of the neckband which are required when the connections are secured to a cord or strip inclosed between the plies of the neckband, and also to simplify the manufacture of neckties of the character mentioned by saving time and labor while insuring a much greater security for the connections and a much more attractive appearance.

The invention also contemplates the provision of an attachment to neckties by a single operation which will provide the connections whereby the necktie is secured in place and also afford a label bearing the name of the manufacturer and other appropriate matter.

My present invention contemplates an improvement in the manufacture of that class of neckties having tabs secured to them in such a position as to be adapted for engaging a front collar button and consists in the provision of a supplementary band which I term a tab-band which is provided at its ends with portions provided with button-holes for securing the ends of the band in position, these free portions being continuous and integral with the tab band but in no way integral with any portion of the tie itself this latter construction having defects which it is the special object of this invention to avoid.

In the drawings: Figure 1 is an elevational view of the complete tie embodying the invention; the dotted lines showing the inner stitches of the band, which however are invisible in the finished product. Fig. 2 is a view of the supplementary tab-band shown in Fig. 1 detached from the tie; Fig. 3 is a detail view showing the first step in the formation of a tab at one end of the supplementary band illustrated in Figs. 1 and 2; Fig. 4 is a detail view of the completed tab shown in Figs. 1 and 2; Fig. 5 is a sectional view on the line V—V of Fig. 4; Fig. 6 is a detail view showing a way of making a modified form of tab; Fig. 7 is a sectional view of the modified form of tab; Fig. 8 is a view showing the mode of securing the supplementary band simultaneously with the stitching of the inner and outer pieces of the necktie proper; Fig. 9 is a sectional view on the line IX—IX of Fig. 8; Fig. 10 is a fragmentary view showing one end of the supplementary band secured as shown in Fig. 8; Fig. 11 is a sectional view on the line XI—XI of Fig. 10.

Referring to the drawings by the reference characters, which designate corresponding parts in the several views, 1 designates the neckband portion and 2 the tying ends of the necktie.

In Figs. 1 and 2, 3 designates a supplementary band which is secured to the neckband portion of the tie along one face thereof and has freely projecting end portions 4 provided with button-holes 5 for engagement with the front collar-button. The supplementary band shown in these figures is stitched along its edges between the two plies of the neckband portion of the tie, no stitching whatever showing on the exposed band throughout its length. The two tying ends of the necktie are of different lengths, as usual, the supplementary band being so applied to the tie that its middle point corresponds to the position of the rear collar button, and the button-holes in the freely projecting ends or tabs are adapted to engage the front collar-button. The supplementary band as shown in these figures is of substantially the same width as the neckband portion of the tie and it may serve as a label as well as to receive the strain to which the tabs are subjected in holding the necktie in place about the collar. The tabs are preferably narrower than the intermediate portion of the supplementary band. These tabs formed by the free projecting ends of the supplementary band may be conveniently constructed as indicated in Figs. 3, 4 and 5. The first step in the making of the tabs is shown in Fig. 3, the material of the supplementary band being simply doubled upon itself and stitched along the lines 6. The surplus material is then cut away and the doubled ends are "turned" so as to fold in the raw edges. After the turning, the button-hole 5 is made through both thicknesses of the doubled fabric and each tab presents the appearance shown in Fig. 4. The interior construction of each tab is shown in Fig. 5.

Instead of doubling each end of the supplementary band upon itself, as shown in Fig. 3, the tabs may be made as indicated in Figs. 6 and 7. Short cuts are made in the material of the neckband adjacent to each end and preferably at right angles to the edges of the band, so as to permit the folding of the lateral portions beyond the cuts upon themselves to present a three-ply tab, as indicated in section in Fig. 7. The button-hole, of course, is formed through the thicknesses of the fabric and the edge of one of the folded-over portions is secured by stitching or other suitable means.

The construction above described, permits the application of the supplementary band to the necktie during the process of manufacture of the necktie. As shown in Fig. 8, the supplementary band is simply laid between the two thicknesses of material which form the inner and outer plies of the necktie, and the edges of the two plies of the necktie proper and of the supplementary band are united simultaneously by machine stitching, the necktie being afterward turned in the usual manner. To facilitate the turning operation, the tabs at the ends of the supplementary neckband may be stitched to the strip of material which is to form the inner ply of the necktie proper. After the turning of the tie has been effected, the tabs at the ends of the supplementary band may be freed of any unnecessary threads used to secure them in place during the turning operation, and the tie is then ready for use.

In the form of neckties above described it will be observed that the tabs or connections by which the necktie is secured in place about the collar are continuous of and integral with the supplementary band and a more finished appearance is given to the completed necktie when they are so made—a consideration of paramount commercial importance.

The supplementary band is made up independently of the necktie and in standard lengths corresponding to the different sizes of collars in general use. This obviates the necessity of measurements upon the tie proper to locate the tabs at proper points for engagement with the front collar-button. All that is necessary is to apply the supplementary band with its middle point over what is known in the trade as the "center" of the neckband; that is, the point on the neckband which will overlie the rear collar-button when the necktie is in use. The supplementary band having been centered in this way, it is simply secured in place, and after turning the tie is ready for service.

Having thus described my invention, what I claim as new and desire to secure by Letters Patent, is:

1. A necktie comprising a double-ply neckband and tying ends, and having a seamless supplementary band whose lateral edges are sewn between the plies of the tie, its surface exposed along the inner face of the neckband and its ends provided with means for securing it at the front of the collar.

2. A necktie comprising a double-ply neckband and tying ends, and having a seamless supplementary band whose lateral edges are sewn between the plies of the tie, its surface exposed along the inner face of the neckband and its ends provided with button-holed tabs to engage the front collar-button.

3. A necktie comprising a double-ply neckband and tying ends, and having a supplementary band whose lateral edges are secured for the greater portion of their length, by concealed stitching, between the plies of the neckband and its free tab-ends provided with means for securing them to the front collar button.

In testimony whereof, I have signed my name in the presence of two witnesses.

CHARLES W. T. DAVIES.

Witnesses:
BAXTER MORTON,
WM. BRADFORD.